United States Patent [19]

Eiland et al.

[11] 4,217,061
[45] Aug. 12, 1980

[54] TAPERED KEY COUPLING

[75] Inventors: P. Frank Eiland, Stamford; David R. Jacobs, New Canaan, both of Conn.

[73] Assignee: Abram N. Spanel, Princeton, N.J.

[21] Appl. No.: 811,956

[22] Filed: Jun. 30, 1977

[51] Int. Cl.$^2$ .......................... F16B 2/06; F16B 7/04; F16D 1/00; F16D 1/02
[52] U.S. Cl. ................................. 403/313; 403/344; 403/356
[58] Field of Search ............... 403/313, 344, 309, 310, 403/312, 319, 358, 356; 285/419, 373, 178, 330

[56] References Cited

U.S. PATENT DOCUMENTS

| | | | |
|---|---|---|---|
| 78,827 | 6/1968 | Porter | 403/312 |
| 907,539 | 12/1908 | Thomas | 403/312 |
| 1,332,395 | 1/1920 | Hachmann | 403/344 X |
| 1,981,500 | 11/1934 | Frelin | 403/344 X |
| 2,623,765 | 12/1952 | Coquille | 403/356 |
| 3,428,343 | 2/1969 | Downie | 403/358 |
| 3,554,589 | 1/1971 | Boggs | 403/313 |
| 3,661,023 | 5/1972 | Maurey | 403/319 X |
| 3,822,953 | 7/1974 | Adelizzi | 403/358 X |
| 3,851,983 | 12/1974 | MacKenzie | 403/312 |
| 3,868,193 | 2/1975 | Schott | 403/344 |
| 3,917,424 | 11/1975 | Zugel | 403/313 X |

FOREIGN PATENT DOCUMENTS 23575 of 1898 United Kingdom ..................... 403/313
237248 6/1926 United Kingdom ..................... 403/344

Primary Examiner—Wayne L. Shedd
Attorney, Agent, or Firm—Steele, Gould & Fried

[57] ABSTRACT

A substantially annular ring having a bore sufficiently large to engage each of two oscillatory shafts, the ring having a radial slot through to the bore and a circumferential slot through to the bore running from the radial slot to a point on the ring opposite the radial slot, thereby forming two semi-annular, rigid spring arms, each having one free end, a tapered key secured in a transverse slot on the inner surface of the central portion of each of the spring arms, the keys engaging tapered keyseats on the ends of each of the shafts, and means for detachably clamping the free ends of each of the spring arms to the ring across the radial slot, thereby independently locking each of the shafts into the coupling.

In an alternative embodiment, the annular ring has a second radial slot through to the bore at the point on the ring opposite the other radial slot, forming the spring arms into completely detachable coupling segments. In order to ensure positive alignment of the shafts, a shim may be rigidly affixed to one of the semi-annular portions in the area of one radial slot, substantially filling the slot when the coupling segments are attached thereto.

10 Claims, 6 Drawing Figures

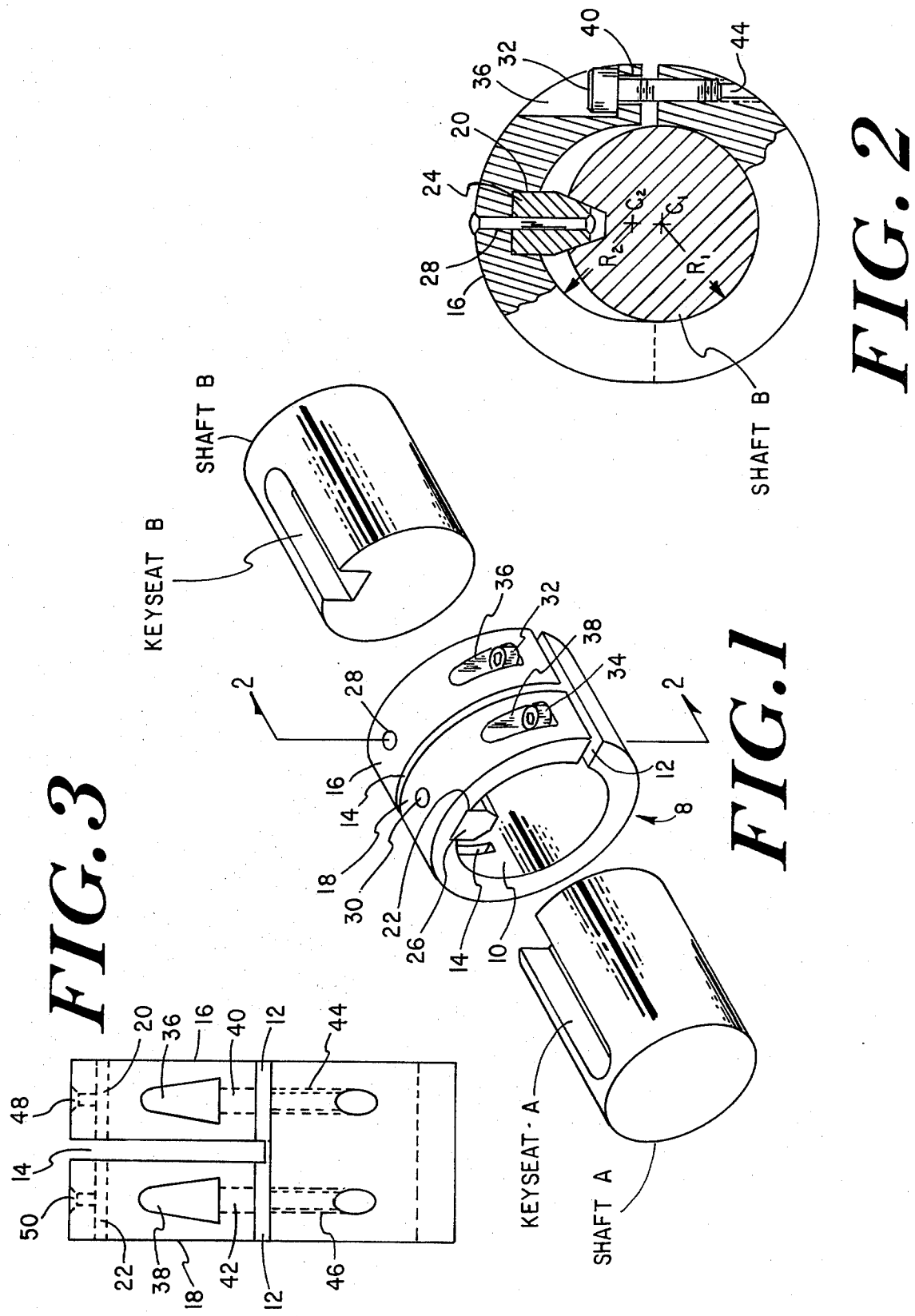

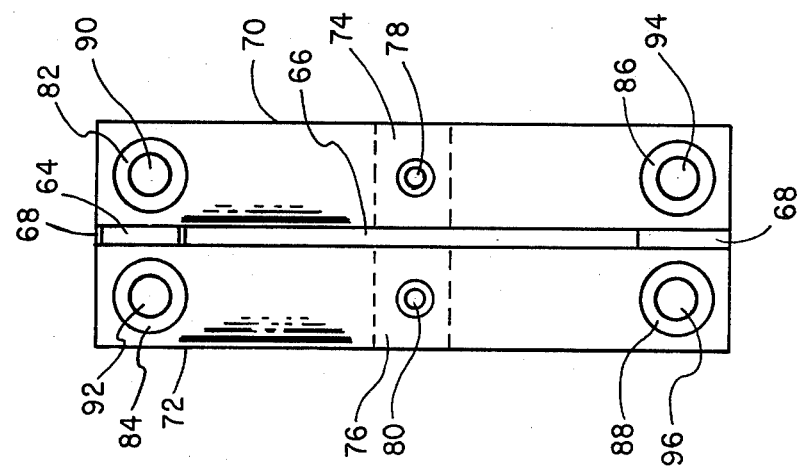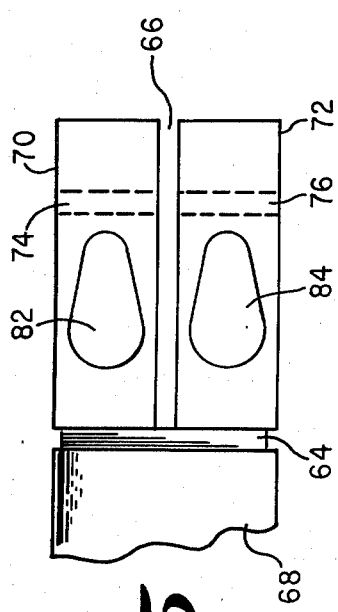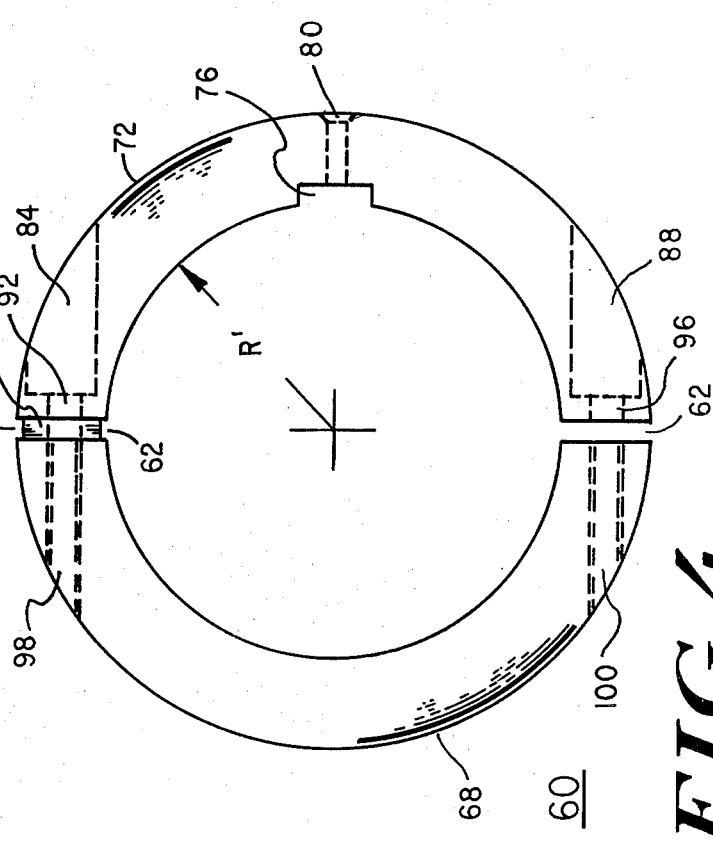

TAPERED KEY COUPLING

BACKGROUND OF THE INVENTION

I. Field of the Invention

This invention relates to shaft couplings, and specifically to a tapered key coupling capable of securing together for rotational movement two shafts which need not necessarily have identical diameters or identically matching keyseats. The invention has particular utility for use in machines such as tufting or other textile machines where the shaft couplings are used in relatively inaccessible areas where precise alignment of coupled members must be possible, yet with easy assembly and disassembly capability.

II. Description of the Prior Art

Conventional couplings for driving one shaft by another shaft for the most part rely on having identically machined slots or keyseats on the ends of the shafts to be joined. Complicated arrangements including as many as five keys inserted into the slots or keyways have been known, each succeeding key forming an ever narrower wedge. This is a time consuming process, and with certain given conditions it may be possible to realign the shafts precisely.

Another significant problem related to the first is the time consuming process of precisely aligning or realigning the shafts to be coupled. This process becomes even more complicated when multiple keys are utilized.

A third significant problem with conventional keyed couplings is that the maximum torque is applied to the outermost edge of the keyway, rather than having the driving load distributed over the inner surface of the keyway. This results in the outer edges of the keyway becoming rolled, and eventually renders the keyway unusable.

It has been suggested, for example in U.S. Pat. No. 3,236,572, to utilize a split hub or collar for securing the collar onto a shaft without disrupting the surface of the shaft by causing burrs. However, this teaching does not meet the problem of joining two shafts which may possibly have different diameters and which almost certainly have non-identical keyseats or slots.

Further, the teaching of aforementioned U.S. Pat. No. 3,236,572 also relies upon a removable key, a particular inconvenience avoided in the coupling of the present invention, and also makes no provision for precisely aligning coupled shafts.

SUMMARY OF THE INVENTION

It is an object of the present invention to provide an improved coupling for connecting two shafts, so that one shaft may be rotatably driven or caused to oscillate by the other shaft, which coupling may be easily and quickly attached or removed.

It is another object of the present invention provide a coupling for securing two shafts, so that one shaft may be rotatably driven by the other shaft, which coupling may be used to connect shafts of unequal diameter.

It is a further object of the present invention to provide a coupling for securing two shafts, so that one shaft may be rotatably driven by the other shaft, which coupling is adapted for use with shafts having different keyseats.

It is a still further object of the present invention to provide a coupling for securing two shafts, so that one shaft may be rotatably driven by the other shaft, which coupling provides independent clamping means for each of said shafts.

It is an additional object of the present invention to provide a coupling for securing two shafts, so that one shaft may be rotatably driven by the other shaft, which coupling provides independent clamping means for each of said shafts, and provides said independent locking means as an integral part of said coupling.

It is yet an additional object of the present invention to provide a coupling for securing two shafts, so that one shaft may be rotatably driven by the other shaft, the use of which coupling will assure that each time said shafts are connected, said shafts will be identically aligned with respect to one another.

It is also an object of the present invention to provide a coupling for securing two shafts, so that one shaft may be rotatably driven by the other shaft, which coupling provides tapered keys for distributing the load of the rotational torque along substantially all of one face of each of the keyseats on each of the shafts.

These and other objects of the present invention are achieved by providing a tapered key coupling, comprising: a substantially annular ring having a bore sufficiently large to engage each of two rotatable or oscillatory shafts, the ring having at least one radial slot through to the bore and a circumferential slot through to the bore running from the radial slot to a point on the ring opposite the radial slot, thereby forming two semi-annular, rigid spring arms, each having one free end, a tapered key secured in a transverse slot on the inner surface of the central portion of each of the spring arms, the keys engaging tapered keyseats on the ends of each of the shafts, and means for detachably clamping the free ends of each of the spring arms to the ring across the radial slot, thereby independently locking each of the shafts into the coupling.

In an alternative embodiment, a second radial slot through to the bore at the point opposite the first radial slot completely frees the two spring arms into coupling segments. These coupling segments are detachably clamped to the opposing semi-annular section of the coupling at both of their free ends. In order to maintain the size of the bore, a shim is rigidly affixed to the opposing semi-annular portion, substantially filling the area of one radial slot. This shim also ensures that the shafts can be precisely realigned whenever the coupling has been detached.

In each of the preferred embodiment, the tapered keys have a cross-section having a trapezoidal portion resting on a rectangular portion of equal width, the rectangular portion being seated in the transverse slot and the tapered end of the trapezoidal portion extending into the bore. The tapered keys are fastened to the coupling by means of a rivet, or other suitable means, and may therefore be replaced when necessary with relative ease.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a perspective view of a tapered key coupling in accordance with the present invention, shown in association with two shafts to be secured therewith;

FIG. 2 is a sectional view taken along the line 2—2 of FIG. 1, with a shaft coupled thereto;

FIG. 3 is a side view of the tapered key coupling of FIG. 1;

FIG. 4 is an end view of an alternative embodiment of a tapered key coupling according to the present invention;

FIG. 5 is a partial top view of the alternative embodiment of the present invention shown in FIG. 4; and, FIG. 6 is a side view of the alternative embodiment of the present invention shown in FIG. 4.

DETAILED DESCRIPTION

A tapered key coupling according to the present invention is shown in FIG. 1. The tapered key coupling may be made from cast or other suitable metal, and comprises a substantially annular ring, designated generally by reference numeral 8. The ring 8 has a bore 10 of sufficient diameter to accommodate shaft A and shaft B. The ring 8 is provided with two rigid spring arms, 16 and 18, formed by radial slot 12 and circumferential slot 14 cut through to the bore 10. As will become apparent, spring arms 16 and 18 are capable of independently locking two shafts into the coupling.

With further reference to FIGS. 2 and 3, spring arms 16 and 18 are provided with transverse slots 20 and 22 respectively. Tapered keys 24 and 26 are mounted into transverse slots 20 and 22 respectively. Tapered key 24 is secured into transverse slot 20 by rivet 28 mounted through countersunk hole 48 and tapered key 26 is mounted in transverse slot 22 by rivet 30, mounted through countersunk rivet hole 50.

With particular reference to FIG. 2, it may be seen that tapered keys 24 and 26 have a uniquely definable cross-section. This cross-section may be described as having a trapezoidal portion resting on a rectangular portion of equal width, the rectangular portion being seated in transverse slots 20 and 22, and the tapered end of trapezoidal portion extending into bore 10. Shafts A and B, which are to be connected by the coupling have tapered keyseats A and B respectively. As shown in FIG. 2, tapered keyseats A and B are shaped to mate with tapered keys 24 and 26. Tapered keyseats A and B are of sufficient depth to accommodate those portions of rivets 28 and 30 which protrude from tapered keys 24 and 26 into bore 10.

In conventionally shaped keyways, loading forces are concentrated at the outer edges of the keys. The result is that these edges become rolled and eventually useless. Replacing the keys requires careful and time consuming alignment. Keys tapered according to the teachings of the present invention cause the loading forces to be distributed substantially uniformly over the surface of the sides of the keys, prolonging key and keyseat life and facilitating the virtually automatic realignment of shafts provided by utilizing a couplng as taught herein.

Spring arms 16 and 18 are additionally provided with counterbores 36 and 38 and unthreaded holes 40 and 42 respectively. Corresponding threaded holes 44 and 46 are provided in ring 8 across radial slot 12 from untheaded holes 40 and 42. Spring arms 16 and 18 may therefore be detachably clamped by means of bolts 32 and 34 respectively, the bolts being slipped through the counterbores and unthreaded holes, and tightened into the threaded holes.

The radius of curvature of substantially annular ring 8 may be defined by two substantially semi-circular portions. The lower section of ring 8, or in other words, that section of ring 8 opposite to spring arms 16 and 18, has a radius designated $R_1$ and a center point designated $C_1$, which radius is substantially the same as the radii of the shafts to be connected. The radius of curvature of the spring arms 16 and 18 is designated as $R_2$ with a centerpoint therefor designated as $C_2$. Radius $R_2$ may be larger than radius $R_1$ or the same as radius $R_1$, but in either case, has its centerpoint vertically offset from the center point $C_1$ of radius $R_1$. This is to provide clearance for tapered keys 24 and 26 as the shafts to be connected are slipped into the coupling. As an alternative not shown, center points $C_1$ and $C_2$ may coincide, with radius of curvature $R_2$ being greater than radius of curvature $R_1$. Hence, the description of ring 8 is substantially annular.

As alternative embodiment of the tapered key coupling according to the present invention is shown in FIGS. 4–6, although the tapered keys have been omitted for the purposes of clarification. In this alternative embodiment, a substantially annular ring, designated by numeral 60, has two radial slots 62 as well as a circumferential slot 66 all cut through to the bore. The effect of the three slots is to form the ring 60 into two semi-annular coupling segments 70 and 72 and an opposing semi-annular section 68. The coupling segments 70 and 72 are provided with transverse slots 74 and 76 respectively, for mounting the tapered keys (not shown).

Both ends of coupling segment 72 are provided with counterbores, 84 and 88, and unthreaded holes 92 and 96. Corresponding threaded holes 98 and 100 are located in opposing section 68 across radial slots 62. The free ends of coupling segment 70 are provided with counterbores, 82 and 86, and unthreaded holes, 90 and 94. Corresponding threaded holes (not shown) are located in opposing section 68, across radial slots 62. Coupling segments 70 and 72 are also provided with countersunk rivet holes 78 and 80 respectively, through which the tapered keys (not shown) may be held to the coupling segments in the transverse slots 74 and 76.

In order to maintain the dimensions of the bore, a spacer or shim 64, ground to the desired dimension, is rigidly affixed by adhesive, screws or other suitable means to semi-annular section 68, substantially filling one of the radial slots. In use, the coupling segments 70 and 72 are bolted at one end to the opposing section 68, with shim 64 interposed therebetween. The bolts must be tightened evenly, in order to ensure positive and precise alignment of the tapered keys.

The radius of curvature of the alternate embodiment of the coupling shown in FIGS. 4–6 is designated as $R'$. Radius of curvature $R'$ corresponds substantially to the radius of the shafts to be connected by the coupling. Both the semi-annular section 68 and the two coupling segments 70 and 72 may have the same radius of curvature, because the offset necessary to accommodate the keys may be provided by the spacing between the opposing section 68 and the coupling segments 70 and 72. This spacing is controllable by the thickness of shim 64, which is normally machined to the width of the radial slot, but may be smaller or larger.

The tapered key coupling according to the present invention may be particularly useful in tufting machines. When used therein, accurate metering of yarn lengths is particularly important. The ability of the coupling according to the present invention to consistently align shafts at the same orientation is critical. It is also important that the coupler has an essentially slim design and may be used in tight quarters. Of particular significance in this respect is the fact that since no shims need be used in the keying procedure, it is possible to mount the coupling according to the present invention both single-handedly and/or with the use of extending tools. No measurements or fitting of separate keys is required. The device need only be slipped on and tightened.

The present invention may be embodied in other specific forms without departing from the spirit or essential attributes thereof, and accordingly, reference should be made to the appended claims, rather than to the foregoing specification as indicating the scope of the present invention.

What is claimed is:

1. A coupling for use particularly in relative inaccessible areas for precisely aligning and connecting shafts having tapered key seats comprising:
   a substantially annular sleeve having a bore of sufficient size to engage said shafts, said sleeve having
     (a) at least one radial slot of specified size through to said bore and a partial circumferential slot through to said bore;
     (b) a first portion comprising clamp arms as defined by said partial circumferential slot and partially spaced outwardly from said shafts; and
     (c) a second portion of substantially equal inner diameter as the diameter of said shafts;
   a tapered key extending inwardly of and generally medially of each of said clamp arms so as to extend to said tapered key seats, and
   means for independently clamping said clamp arms across said radial slot to said second portion whereby the relationship of (a) the specified size of the radial slot, (b) the space between the first portion and the shafts, and (c) the size of said keys, enables said shafts to be precisely aligned by said keys as they are coupled.

2. The coupling of claim 1, further comprising:
   a transverse slot on the inner surface of each of said arms for seating said keys; and,
   means for fastening each of said keys in said transverse slots.

3. The coupling of claim 1, wherein the curvature of said bore is defined by two semi-circles having equal radii, said radii having center points slightly offset from one another.

4. The coupling of claim 1, wherein said bore is defined by two radii of curvature, the radius of curvature of said bore formed by said arms being the larger of said two radii.

5. The coupling of claim 1, wherein said detachable clamping means comprises securement means tangentially countersunk into each of said arms and corresponding receiving means in said second portion.

6. The coupling of claim 1, wherein said circumferential slot runs from said at least one radial slot to a point on said sleeve substantially opposite said at least one radial slot, thereby causing said arms and said second portion to be substantially semi-annular.

7. The coupling of claim 2, wherein each of said tapered keys has a cross-section having a trapezoidal portion resting on a rectangular portion of equal width, the rectangular portion being seated in said transverse slot and the tapered end of said trapezoidal portion extending into said bore.

8. The coupling of claim 1, further comprising:
   a second radial slot through to said bore at said point substantially opposite said at least one radial slot,
   second means for detachably clamping said arms to said second portion across said second radial slot; and,
   a spacer interposed in one of said radial slots.

9. The coupling of claim 8, further comprising:
   a transverse slot on the inner surface of each of said arms for seating said keys; and,
   fastening means for fastening each of said keys in said transverse slots.

10. The coupling of claim 8, wherein both of said detachable clamping means comprise securement means tangentially countersunk into each of said arms and corresponding receiving means in said second portion.

UNITED STATES PATENT OFFICE
CERTIFICATE OF CORRECTION

Patent No. 4,217,061      Dated AUGUST 12, 1980

Inventor(s) P. FRANK EILAND and DAVID R. JACOBS

It is certified that error appears in the above-identified patent and that said Letters Patent are hereby corrected as shown below:

Col. 1, line 25, "possible" should be --impossible--.

Col. 1, line 57, after "invention" insert --to--.

Col. 2, line 49, "embodiment" should be --embodiments--.

Col. 3, line 54, "couplng" should be --coupling--.

Col. 3, lines 58 and 59, "untheaded" should be --unthreaded--.

Col. 4, line 14, "As" should be --An--.

Signed and Sealed this

Twenty-eighth Day of October 1980

[SEAL]

Attest:

SIDNEY A. DIAMOND

Attesting Officer     Commissioner of Patents and Trademarks